US 7,017,125 B1

(12) United States Patent
Matsumoto

(10) Patent No.: US 7,017,125 B1
(45) Date of Patent: Mar. 21, 2006

(54) PORTABLE TERMINAL SYSTEM, PORTABLE TERMINAL, METHOD OF CONTROLLING PORTABLE TERMINAL, AND STORAGE MEDIUM STORING PROGRAM FOR CONTROLLING PORTABLE TERMINAL

(75) Inventor: Hidehiro Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 381 days.

(21) Appl. No.: 09/680,479

(22) Filed: Oct. 6, 2000

(30) Foreign Application Priority Data

Oct. 6, 1999 (JP) ................................. 11-284981

(51) Int. Cl.
*G06F 3/00* (2006.01)
*H04Q 7/20* (2006.01)

(52) U.S. Cl. ...................... 715/864; 715/705; 715/709; 715/764; 715/831; 455/426.1; 455/426.2

(58) Field of Classification Search ................ 345/156, 345/169, 172, 700–705, 715, 764, 810, 831, 345/835, 864; 455/461, 426, 426.1; 715/705, 715/709, 764, 831, 864
See application file for complete search history.

(56) References Cited

U.S. PATENT DOCUMENTS

| 5,202,817 | A | * | 4/1993 | Koenck et al. ............. 361/680 |
| 5,517,574 | A | * | 5/1996 | Tichy .......................... 381/386 |
| 5,625,683 | A | * | 4/1997 | Nazanin et al. ........ 379/355.06 |
| 5,646,649 | A | * | 7/1997 | Iwata et al. .................. 345/173 |
| 5,742,905 | A | * | 4/1998 | Pepe et al. ................... 455/461 |
| 5,754,306 | A | * | 5/1998 | Taylor et al. ................ 358/400 |
| 5,877,757 | A | | 3/1999 | Bladwin et al. |
| 5,889,516 | A | * | 3/1999 | Hickey et al. .............. 345/740 |
| 5,902,948 | A | * | 5/1999 | Haruyama .................... 84/609 |
| 5,956,655 | A | * | 9/1999 | Suzuki et al. ............... 455/566 |
| 5,961,590 | A | * | 10/1999 | Mendez et al. ............. 709/206 |
| 6,496,872 | B1 | * | 12/2002 | Katz et al. ................... 719/318 |

FOREIGN PATENT DOCUMENTS

| EP | 0 890 909 | 1/1999 |
| FR | 2 769 781 | 4/1999 |
| JP | S63-150719 | 6/1988 |
| JP | H1-280821 | 11/1989 |
| JP | H2-186417 | 7/1990 |

(Continued)

*Primary Examiner*—Ba Huynh
*Assistant Examiner*—Truc Tung Chuong
(74) *Attorney, Agent, or Firm*—Sughrue Mion, PLLC

(57) ABSTRACT

A portable terminal provided with a text browser for perusing text contents which are supposed to be displayed on a display of the portable terminal, and a help browser for perusing help contents showing methods of utilizing the text contents. When a certain message is inputted from outside, it is determined whether the input message is a text message or a help message, according to which either the text browser or the help browser is activated. The help browser outputs the help contents through text, voice, static images, or moving images. The portable terminal sets each of a plurality of switch keys to an effective state or an ineffective state in accordance with the contents of the help contents. In setting certain switch keys to effective states, LEDs, etc. provided corresponding to those switch keys are lighted. When the rest of the switch keys are set to ineffective states and any operation by those switch keys are made ineffective, not only the operation by the user becomes simple, but also false operation can be prevented.

24 Claims, 7 Drawing Sheets

FOREIGN PATENT DOCUMENTS

| | | |
|---|---|---|
| JP | H3-30009 | 2/1991 |
| JP | H8-221173 | 8/1996 |
| JP | H8-272572 | 10/1996 |
| JP | H9-97235 | 4/1997 |
| JP | H9-106319 | 4/1997 |
| JP | H10-84404 | 3/1998 |
| JP | H10-245493 | 9/1998 |
| JP | 10-322478 | 12/1998 |
| WO | WO 99/53679 | 10/1999 |

* cited by examiner

F I G. 1
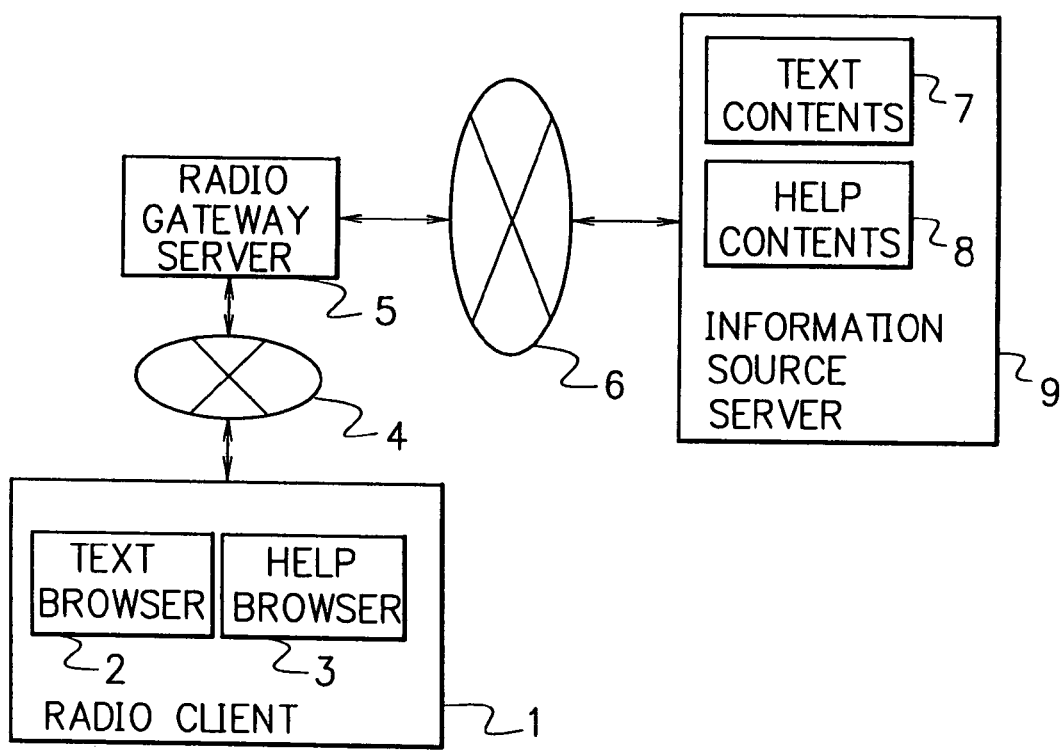

PORTABLE TERMINAL SYSTEM, PORTABLE TERMINAL, METHOD OF CONTROLLING PORTABLE TERMINAL, AND STORAGE MEDIUM STORING PROGRAM FOR CONTROLLING PORTABLE TERMINAL

BACKGROUND OF THE INVENTION

The present invention relates to a portable terminal system, a portable terminal used in the portable terminal system, a method of controlling the portable terminal, and a storage medium storing a program for controlling the portable terminal. In particular, the present invention relates to a portable terminal system which is capable of using information from an information source server connected to the internet, a portable terminal used in such portable terminal system, a method of controlling the portable terminal, and a storage medium storing a program for controlling the portable terminal.

DESCRIPTION OF THE RELATED ART

In recent years, information is commonly provided through the internet by hyper text including multimedia data called WWW (World Wide Web). Generally, access to information on the WWW is made by an application of a WWW browser which operates on personal computers. The WWW browser is a software module for perusing information on the WWW. In the following, the WWW browser will be simply referred to as "browser". Besides personal computers, there are other electrical appliances such as a television set that loads a browser, and information on the WWW can be accessed through such appliances as well.

Also known is a portable terminal with a telephone function having a browser loaded. In accordance with Japanese Patent Application Laid-Open Publication No. 10-322478, WWW information is transmitted from a WWW server unit to a portable terminal where the WWW information is made available for use. In addition, in this portable terminal, links and text of the WWW information are separated, and only the links are organized for being read out, thus enabling a hyper link retrieval by speech.

In case when a user attempts to use information from an information source server connected to the internet, through a portable terminal such as a portable telephone, etc., the operation method will be different depending on the contents of the transmitted information. Therefore, it has been a problem that there are some difficulties in trying to gain access to the desired information. On the other hand, a unified operation method has been proposed to solve such problem, although it is not progressing, because information providers are concerned about the fact that such differences in operability are factors for the users to determine the quality of the service.

Furthermore, in representing the operation method, it should be more effective if voices, moving images, static images, etc. are used in addition to a display by characters, depending on the contents of information. It should be especially useful for physically handicapped people when they are provided with such options for learning the operation methods.

SUMMARY OF THE INVENTION

The present invention has been achieved in order to solve such problems in the prior art, and it is an object of the present invention to provide a portable terminal system and a portable terminal for use in this system, which require simple operation. Furthermore, another object of the present invention is to provide a portable terminal system, a portable terminal for used in this system, a method of controlling the portable terminal, and a storage medium storing a program for controlling the portable terminal, which can be easily operated particularly by people who have weak eyesight.

In accordance with the present invention, there is provided a portable terminal system comprising: a server storing text contents which are supposed to be displayed at a display section of a portable terminal, and help contents which show a method of utilizing said text contents; and a portable terminal including a text browser provided for use in perusing the text contents stored in said server, and a help browser provided for use in perusing the help contents also stored in said server.

In accordance with the portable terminal system of the present invention, the portable terminal includes a text browser provided for use in perusing text contents which are supposed to be displayed at a display section of the portable terminal, and a help browser provided for use in perusing help contents which show a method of utilizing said text contents.

In accordance with the portable terminal system of the present invention, the portable terminal further includes a judging means for judging whether a message inputted from outside belongs to a text message or a help message, and activates either said text browser or said help browser in accordance with a result of judgement by the judging means.

In accordance with the portable terminal system of the present invention, the help browser outputs the help contents as text, voice, static images, moving images, or any combination of such representation formats.

In accordance with the portable terminal system of the present invention, the portable terminal further includes a plurality of switch keys for use in operations for using the text contents, and a switch-key controlling means for setting each of said plurality of switch keys to either an effective state or an ineffective state depending on the contents of the help contents.

In accordance with the portable terminal system of the present invention, in case when said switch keys are set to the effective state, said switch-key controlling means lights up light emitting sections corresponding to the switch keys being set to the effective state.

In accordance with the portable terminal system of the present invention, in case when said switch keys are set to the effective state, said switch-key controlling means vibrates operation buttons for those switch keys which are being set to the effective state.

In accordance with the present invention, there is provided a portable terminal comprising: a text browser provided for use in perusing text contents which are supposed to be displayed at a display section of the portable terminal; and a help browser provided for use in perusing help contents which show a method of utilizing said text contents.

In accordance with the present invention, the portable terminal further comprises: a judging means for judging whether a message inputted from outside belongs to a text message or a help message, enabling the portable terminal to activate either said text browser or said help browser in accordance with a result of judgment by said judging means.

In accordance with the portable terminal of the present invention, the help browser outputs said help contents as text, voice, static images, moving images, or any combination of such representation formats.

In accordance with the present invention, the portable terminal further comprises a plurality of switch keys for use in operations for using said text contents; and a switch-key controlling means for setting each of said plurality of switch keys to either an effective state or an ineffective state depending on the contents of said help contents.

In accordance with the portable terminal of the present invention, in case when said switch keys are set to the effective state, said switch-key controlling means lights up light emitting sections corresponding to the switch keys being set to the effective state.

In accordance with the portable terminal of the present invention, in case when said switch keys are set to the effective state, said switch key controlling means vibrates operation buttons for those switch keys which are being set to the effective state.

In accordance with the present invention, there is provided a method of controlling a portable terminal comprising the steps of: judging whether a message inputted from outside belongs to a text message or a help message; and activating either a text browser provided for use in perusing text contents which are supposed to be displayed at a display section of the portable terminal, or a help browser provided for use in perusing help contents which show a method of utilizing said text contents, in accordance with a result of judgment by said step of judging.

In accordance with the present invention, there is provided a storage medium storing a program for controlling a portable terminal, wherein said program comprises the steps of: judging whether a message inputted from outside belongs to a text message or a help message; and activating either a text browser provided for use in perusing text contents which are supposed to be displayed at a display section of the portable terminal, or a help browser provided for use in perusing help contents which show a method of utilizing said text contents, in accordance with a result of judgment by said step of judging.

Therefore, in the system of the present invention, in providing (displaying) information from an information source server connected to the internet, by a browser contained in a portable terminal (to be referred to as "radio client" in the following) such as a portable cellular phone, etc., the contents of information stored in the information source server (to be referred to as "contents" in the following) are divided into information on operation procedures for the user (to be referred to as "help contents" in the following), and information on the other things (to be referred to as "text contents" in the following). Furthermore, the portable terminal being a radio client contains functions of a text browser and a help browser for perusing the text contents and the help contents, respectively. In addition, in response to a process by the help browser, the radio client is capable of displaying the operation procedures on its screen, showing and designating key buttons necessary for operation, responding to an operation through voice, and showing the operation procedures on the screen by moving images or static images, and graphics.

BRIEF DESCRIPTION OF THE DRAWINGS

The above and further objects, and the novel features of the present invention will more fully appear from the following detailed description when the same is read in connection with the accompanying drawings, in which:

FIG. 1 is a block diagram showing a configuration of a portable terminal system in one embodiment of the present invention;

DESCRIPTION OF THE PREFERRED EMBODIMENT

Figure 2:
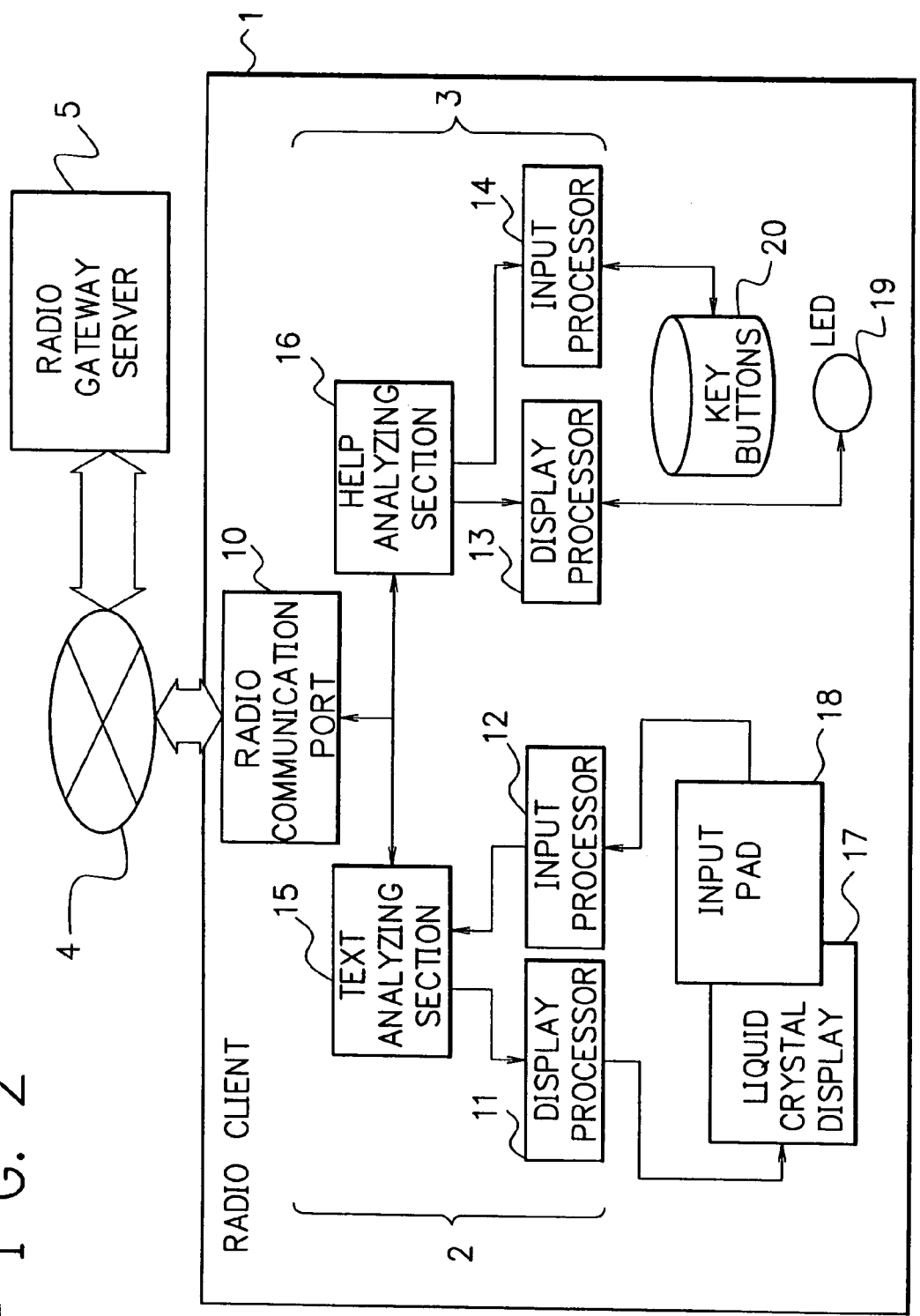
FIG. 2 is a block diagram showing an example of an internal structure of a portable terminal for use in the portable terminal system shown in FIG. 1.

Referring now to the drawings, a description of a preferred embodiment of the present invention will be given in detail. In the drawings, the same number is given to the same constituents.

With reference to FIG. 1, one embodiment of a portable terminal system in accordance with the present invention will be described.

In FIG. 1, an information source server 9 stores text contents 7 and help contents 8. A radio client 1 comprises a text browser 2, and a help browser 3. The text browser 2 analyzes and displays the text contents 7, and executes an input process. The text browser 3 analyzes and displays the text contents 8, and executes an input process. The radio client 1 is connected to a radio gateway server 5 through a radio communication network 4, and the radio gateway server 5 is further connected to the information source server 9 through a wire network 6 such as the internet, etc.

The radio gateway server 5 mediates between the radio client 1 and the information source server 9, passing data from the information source server 9 to the radio client 1. The radio gateway server 5 also monitors the radio client 1 and executes user authentication. The information source server 9 provides information written in a language such as HTML (hyper text markup language), XML (extended markup language), WML (wireless markup language), compact HTML, etc., in response to a request by the client 1.

In order to provide information in an effective way, the information provider finds some relevancy between the text contents 7 and the help contents 8. This certain relevancy is called a "link". At this time, a representation format (i.e. character information, voice information, moving image information, static image information, graphics information, etc., or any combination of such types of information representation, used in reproducing the help contents in the radio client 1 by a browser) and an input format (i.e. designation of input keys, etc.) of the help contents 8 are inserted to the help contents 8, and thus the operation, the representation format, and the input method are designated by the information provider.

In FIG. 2, an example of an internal structure of the radio client 1 is shown. The radio client 1 executes communications through the radio communication network 4 and a radio communication port 10. The radio communication port 10 executes transmission/reception between a text browser and a help browser 3, which are contained in the radio client 1.

As illustrated in FIG. 2, the text browser 2 comprises a text analyzing section 15, a display processor 11, and an input processor 12. The text analyzing section 15 analyzes data received from the radio gateway server 5, and executes appropriate process in response to the analyzed data. The display processor 11 conducts a display process to display the analyzed data at a display output device 17 such as a liquid crystal display device. The input processor 12 executes an input process for the input device 18 such as an input pad.

Figure 3:
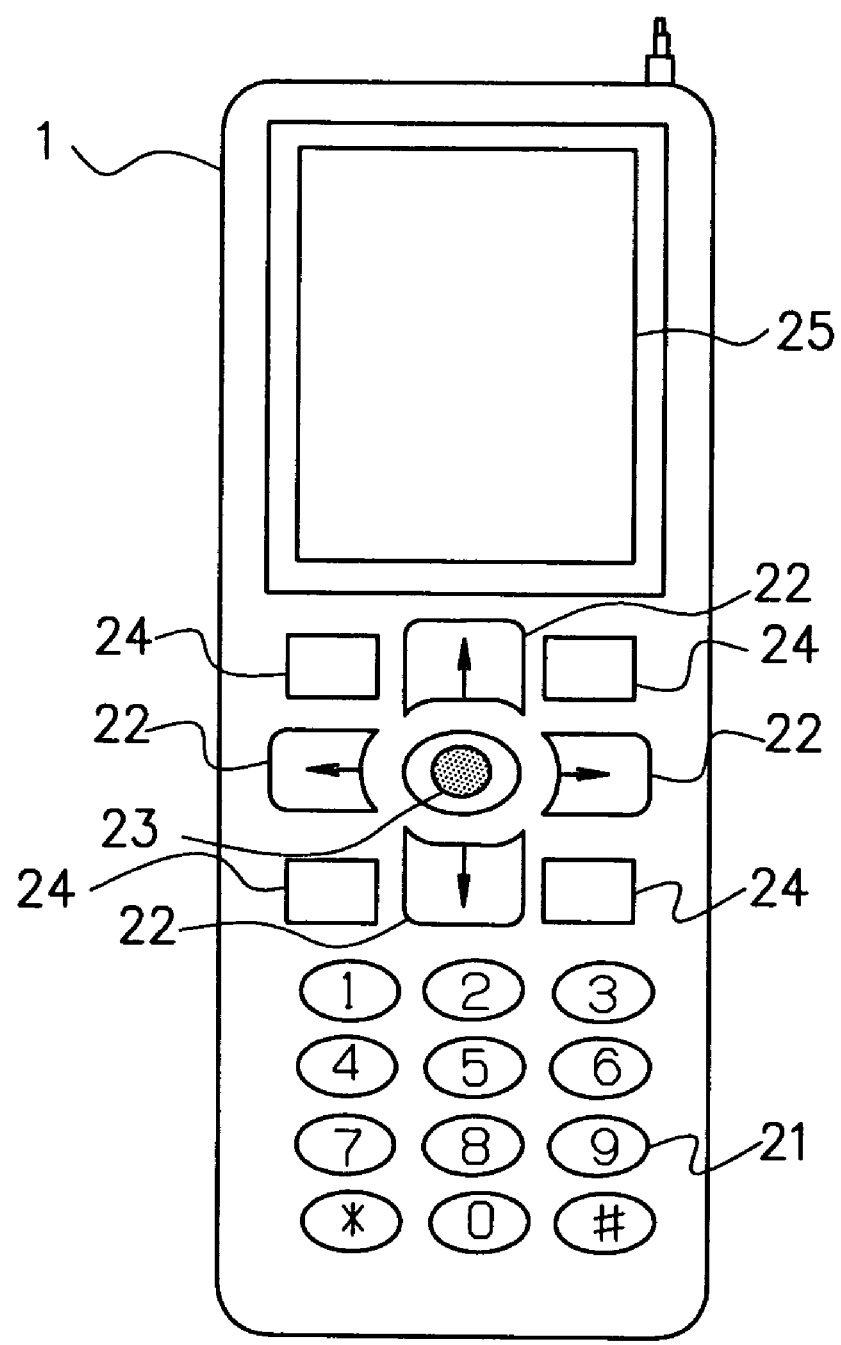
FIG. 3 is a view showing an appearance of the portable terminal shown in FIG. 2.

On the other hand, the help browser 3 depends mainly on an input method of the radio client 1. For instance, as shown in FIG. 3, a portable telephone terminal in particular is provided with some switch-key buttons including ten keys 21, arrow keys 22, soft keys 24, a decision key 23, etc. In this case, the ten keys 21 are used in inputting telephone numbers, etc. The up arrow, down arrow, right arrow, and left arrow keys 22 are pressed when moving a cursor, which is a help display on a screen 25 for stimulating inputs. The soft keys 24 are used in designating a use under particular contents on the screen 25. The decision key 23 is used in deciding an execution of a designated process. All these switch-key buttons in FIG. 3 correspond to key buttons 20 in FIG. 2. Furthermore, as shown in FIG. 2, the help browser 3 is provided with an output device 19 which is capable of emitting light beneath the key buttons, etc., using a light emitting diode (LED), complying with particular contents and user's status, thus attracting the user's attention.

As shown in FIG. 2, the help browser 3 is provided with a help analyzing section 16, a display processor 13, and an input processor 14. The help analyzing section 16 analyzes data received from the radio gateway server 5, and executes appropriate process in response to the analyzed data. The display processor 13 conducts a display process. The input processor 14 executes an input process. The text analyzing section 15 and the help analyzing section 16 can execute the same kind of process, although in this case, they are indicated as different functions for better describing the structure of the present embodiment.

FIG. 3 illustrates an example in which the present invention is applied to a radio client 1 being a portable telephone terminal. The screen 25 in FIG. 3 is a combination of the input device 18 and the output device 17 shown in FIG. 2, and all kinds of inputs can be executed using the parts displayed on the screen.

Now the operation of the system based on the above-described structure will be described with reference to a flow chart in FIG. 4.

Figure 4:
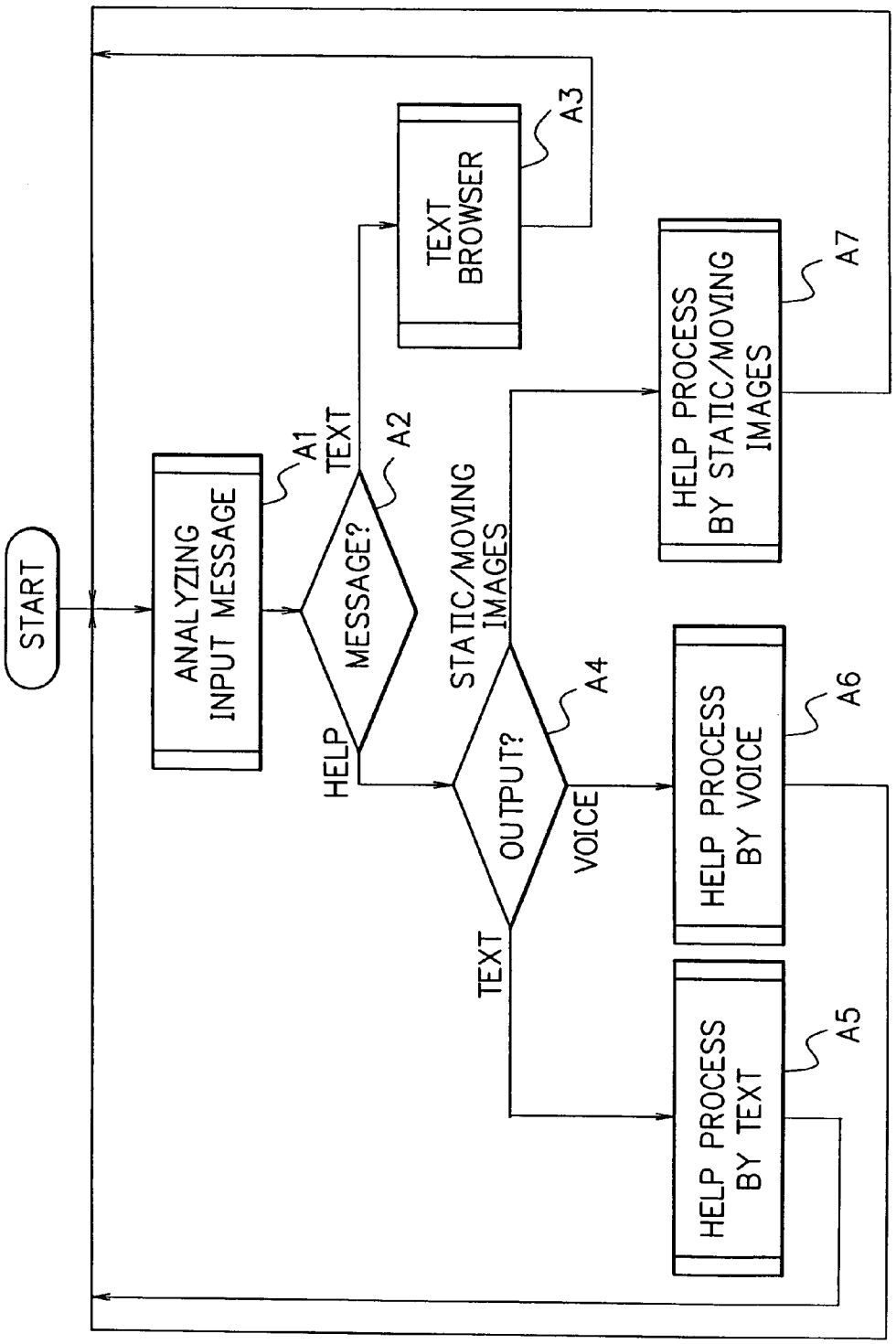
FIG. 4 is a flow chart showing an operation of the portable terminal shown in FIG. 2.

Referring to FIG. 4, first, when certain contents are provided to the radio client 1 from the information source server 9, the contents go through a process for received message at the radio communication port 10 (step A1). Here, the text browser 2 and the help browser 1 analyzes the messages (description language group including XML, HTML and WML containing a tag) contained in the received contents, and the contents including the messages.

When the input message belongs to text contents, it is processed by the text browser (step A2→step A3). On the other hand, when the input message belongs to help contents, the help analyzing section 16 analyzes to decide the type of message output for the input message (step A2→step A4).

Figure 5:
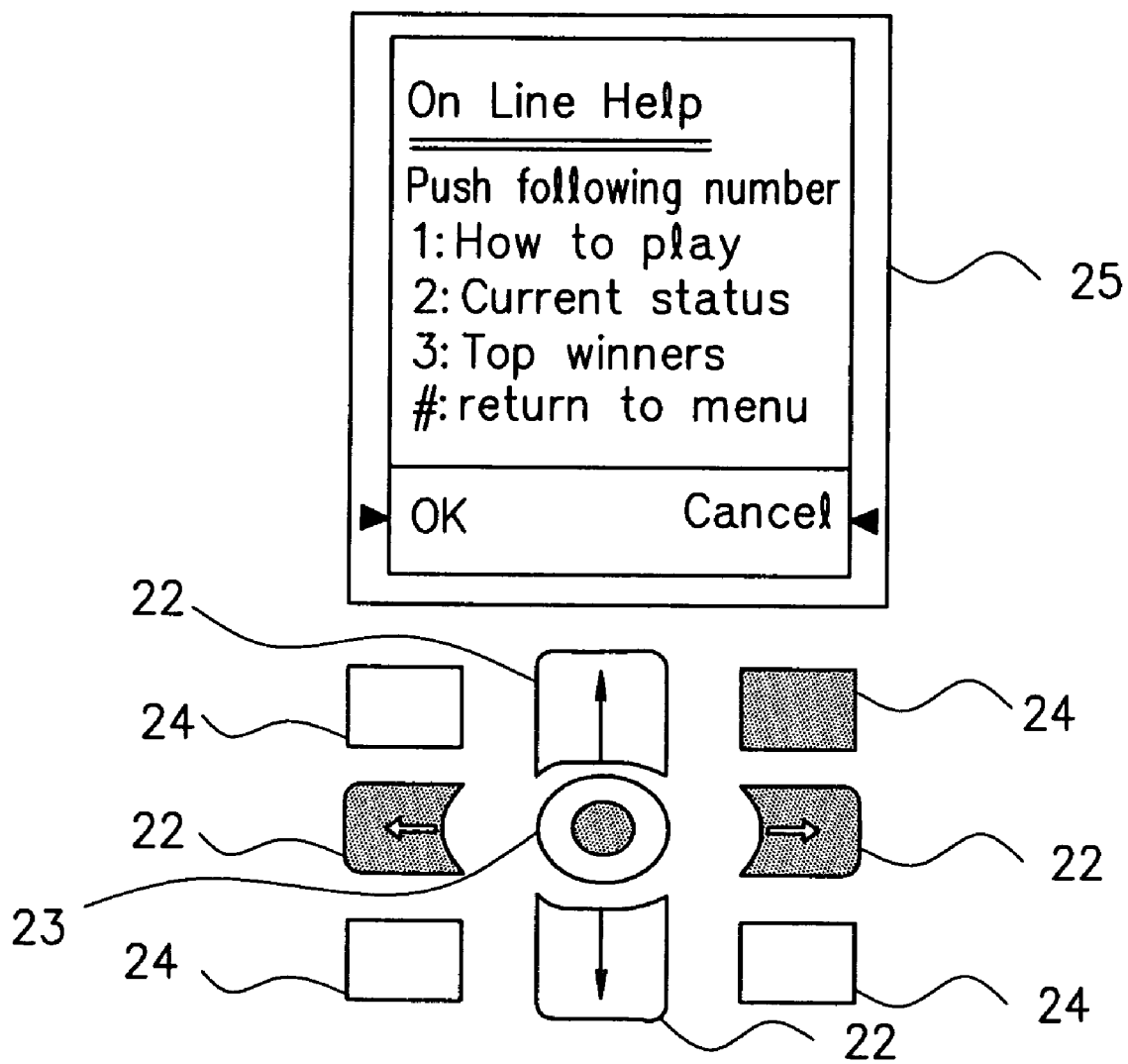
FIG. 5 is a view showing an example of a display on a display screen of the portable terminal in case when help contents include character information.

As a result of such type judgement, when it is determined that the help contents include character information, a help process by text is executed (step A4→step A5). In this case, the display will be as shown in FIG. 5, and the input operation will be limited to particular keys corresponding to which LEDs, etc. are internally provided to be lighted up. For example, in case of using only the right arrow and left arrow keys 22, and the upper right soft key 24, the internally provided LEDs, etc. corresponding to those keys are lighted up to indicate that only the key inputs by those keys can be accepted. In other words, only those keys are set available for valid key inputs. In FIG. 5, those limited keys are illustrated in reversed black and white. In this particular example, among those keys, the right arrow and left arrow keys 22 correspond to 'OK' and 'Cancel' indications on the screen 25, respectively, and one of the soft keys 24 (i.e. the upper right key) is associated with the operation for redrafting the help display.

In FIG. 5, a menu of an "On Line Help" is displayed on the screen 25. In this example, the menu of the "On Line Help" includes "How to play", "Current status", and "Top winners", and those menu items are given numbers 1, 2 and 3, respectively. When one of those numbers is inputted through a key-input, the corresponding menu item is executed.

Figure 6A:
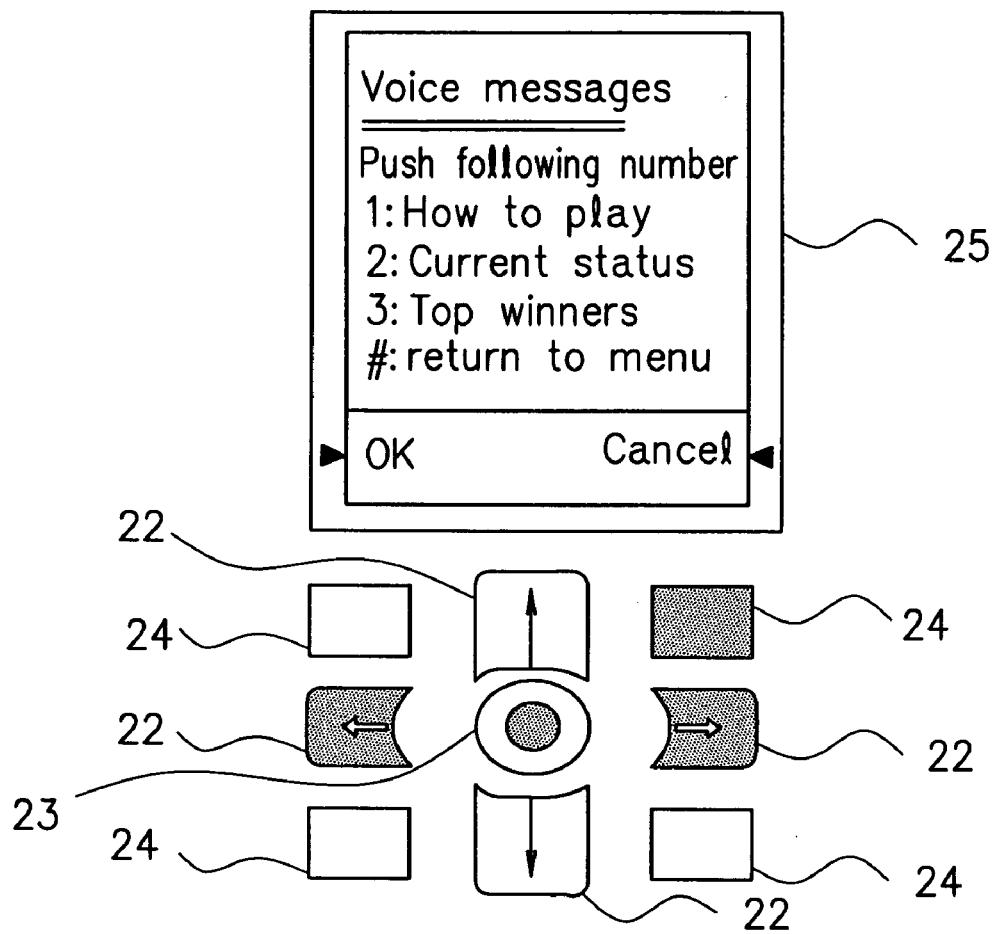
FIG. 6A is a view showing an example of a display on a display screen of the portable terminal in case when the help contents include voice information.
Figure 6B:
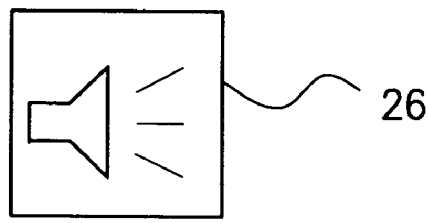
FIG. 6B is another view showing the example of a display on a display screen of the portable terminal in case when the help contents include voice information.

On the other hand, when the help contents are determined as including voice information, as a result of the type judgement of step 4 in the flow chart of FIG. 4, then a help process by voice is executed (step A4–step A6). In this case, as illustrated in FIG. 6A, "Voice messages" will be displayed on the screen 25 to indicate that the output method for the help contents will be a voice output. In this particular example, the operation of reading out the help contents through voice when redrafting the help display is assigned to one of the soft keys 24 (i.e. the upper right key). Consequently, the user can confirm the help contents through voice even when the user is under the circumstances where the display screen is invisible. The illustration shown in FIG. 6B indicates that the voice is outputted from a speaker 26 provided to the terminal.

In this case also, the input operation is limited to particular keys only, and LEDs, etc., internally provided corresponding to those keys are lighted up. In FIG. 6A, those limited keys are illustrated in reversed black and white.

Figure 7:
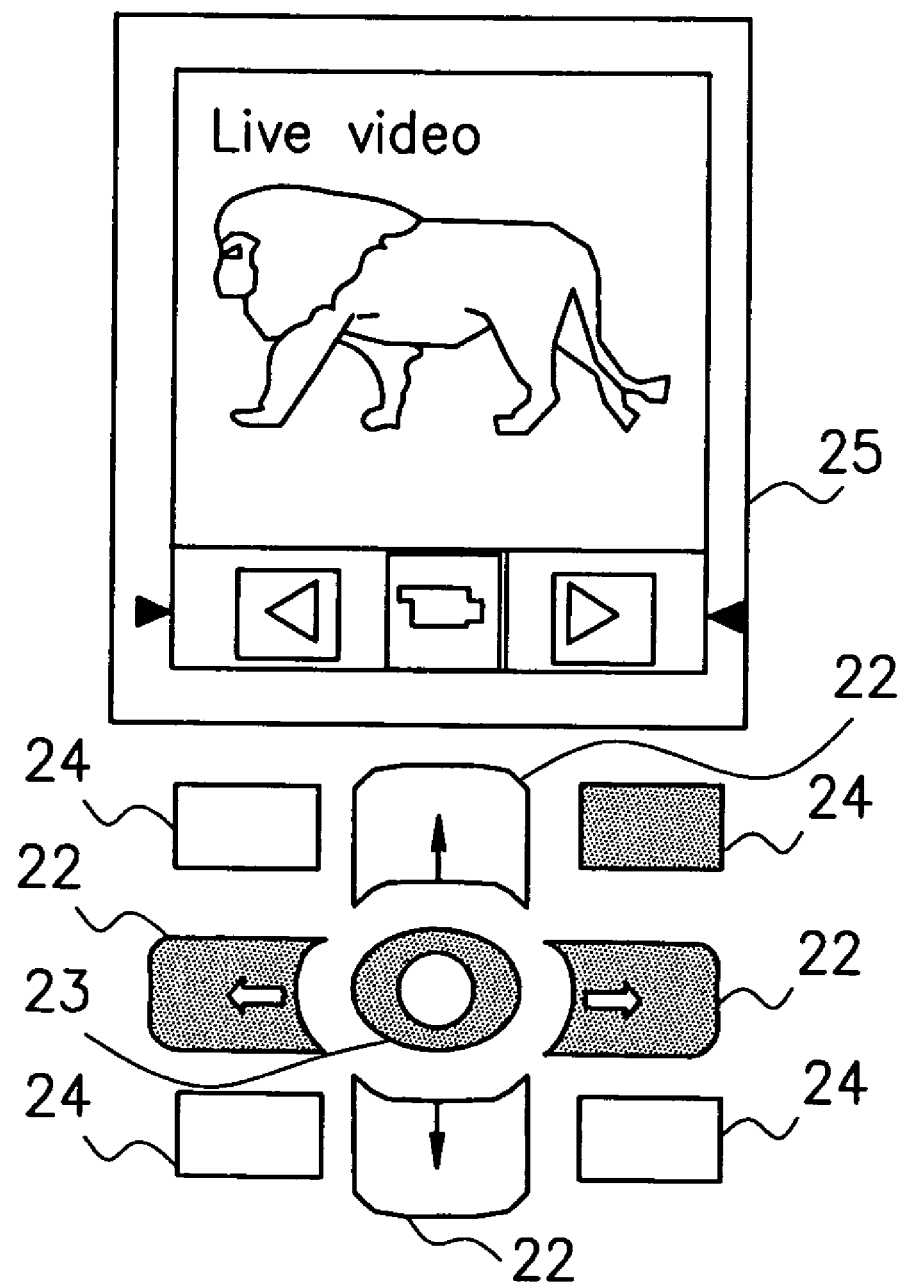
FIG. 7 is a view showing an example of a display on a display screen of the portable terminal in case when the help contents include static images, moving images, etc., besides character information.

Furthermore, when the help contents are determined as including information of static images, moving images, graphics, animations, etc., besides character information, then a help process by moving images, static images, etc. is executed (step A4→step A7). In this case, as shown in FIG. 7, there will be no "OK" and "Cancel" indications on the screen 25 as in the cases of FIG. 5, FIG. 6A and FIG. 6B, but plane figures (e.g. triangles pointing right and left) indicating "rewind", "replay", and "fast forward" are displayed instead. The right arrow and left arrow keys 22 are associated with "fast forward" and "rewind" operations, respectively, and the operation key 23 is associated with a "replay" operation. In this case, when voice indication is included, the help contents can be confirmed through voice by pressing the soft key 24, as in the case explained with reference to FIG. 6A and FIG. 6B. Therefore, the help contents can be confirmed even under the circumstances where the display screen is invisible.

In this case also, the input operation is limited to particular keys only, and LEDs, etc., internally provided corresponding to those keys are lighted up. In FIG. 6A, those limited keys are illustrated in reversed black and white.

As described above, the control method described with reference to FIG. 4 is applied to the system of the present invention, and the portable terminal is controlled by this control method. This control method includes a judging step for judging whether the message inputted from outside is a text message or a help message, and a browser activating step for activating the text browser or the help browser. The text browser is provided for perusing text contents which are supposed to be displayed on a display section of the portable terminal in response to the result of judgement at the judging step. The help browser is provided for perusing help contents introducing a method of utilizing the text contents. In the browser activating step, the help contents are outputted by text, voice, static images, or moving images.

With respect to the above-described portable terminal, although the help contents are used in simplifying the operation for the user, it is also possible to set the help contents for advertisement and publicity, which enables the user to become familiar with the services provided thorough commercial contents beforehand. For example, one service could be a provision of pay contents which is charged from the point a certain key designated by the help contents is pressed.

Consequently, in accordance with the present invention, by using the help contents and the corresponding help browser, certain operation methods that have not been able to be introduced to the user by the conventional text contents alone, become available. For instance, it is possible to designate only certain keys corresponding to certain contents for use, and set the key operations by other keys to become ineffective. In this way, the operations by the user can be simplified and false operations can be prevented at the same time.

Furthermore, in accordance with the present invention, not only character information but also multi-media information including voice, static pictures, moving pictures, graphics, animations, etc. can be used, which are applicable for use as a manual at a factory site, for use in an equipment maintenance, for use in a guide to a certain place, and so forth.

In addition, in accordance with the present invention, even a person having a trouble with eyesight can learn the operation method through hearing voice messages, and can execute the operation just like a non-handicapped person by feeling vibrations from the key buttons. In this case, a vibrator should be provided inside the portable terminal corresponding to each key button.

It is also obvious that the above-described control operation for the portable terminal can be executed when a storage medium storing a program for executing the process described with reference to FIG. 4 is provided to control each part illustrated in FIG. 2. Although it is not shown in FIG. 2, all kinds of storage mediums such as a semiconductor memory, magnetic disc device, etc. can be used for such storage medium.

Furthermore, it is also obvious that the above-described operation can be executed in a portable type computer, etc. by a program stored in the above-described storage medium. For this storage medium, for example, it is possible to use a semiconductor memory, a magnetic disc device, and other kinds of storage medium.

As described above, in accordance with the present invention, by using the help contents and the corresponding help browser, certain operation methods that have not been able to be introduced to the user by the conventional text contents alone, become available. For example, it is possible to designate only certain keys corresponding to certain contents for use and set the key operations by other keys to become ineffective. Thus, the operations by the user can be simplified and false operations can be prevented at the same time. This should be noted as one unique effect of the present invention.

Another effect of the present invention is that not only character information but also multi-media information including voice, static pictures, moving pictures, graphics, animations, etc. can be used, which are applicable for use as a manual at a factory site, for use in an equipment maintenance, for use in a guide to a certain place, and so forth.

Furthermore, another effect of the present invention is that even a person having a trouble with eyesight can learn the operation methods through hearing voice messages, and can execute the operation just like a non-handicapped person by feeling vibrations from the key buttons. In this case, a vibrator should be provided inside the portable terminal corresponding to each key button.

While the preferred embodiment of the invention has been described using specific terms, such description is for illustrative purposes only, and it is to be understood that changes and variations may be made without departing from the spirit or the scope of the following claims.

What is claimed is:

1. A portable terminal system comprising:
a server which stores text content and help content, wherein the help content includes specific information regarding how to retrieve or use the text content; and
a portable terminal comprising a text browser which accesses and processes the text content stored in said server, and a help browser which processes the help content stored in said server,
wherein at least one hardware function of the portable terminal is automatically controlled based on the processed help content in order to assist the user in utilizing the text content,
wherein said portable terminal further comprises a plurality of switch keys for use in operations for using said text content, and a switch-key controlling means for individually setting each of said plurality of switch keys to either an effective state or an ineffective state based on said help content.

2. A portable terminal system as claimed in claim 1, wherein said portable terminal further comprises a judging means for determining whether a message which is received by the portable terminal is text content or help content, wherein said judging means activates the text browser if the message is determined to be text content and activates the help browser if the message is determined to be help content.

3. A portable terminal system as claimed in claim 2 wherein said help browser outputs said help contents as any one of text, voice, static images, and moving images.

4. A portable terminal system as claimed in claim 1 wherein if said switch keys are set to the effective state by the switch-key controlling means, said switch-key controlling means illuminates light emitting sections corresponding to the switch keys which are set to the effective state.

5. A portable terminal system as claimed in claim 1 wherein if said switch keys are set to the effective state by the switch-key controlling means, said switch-key controlling means vibrates operation buttons for those switch keys which are set to the effective state.

6. A portable terminal system as recited in claim 1, wherein said portable terminal is a mobile telephone.

7. A portable terminal system as recited in claim 1 wherein said portable terminal is a personal digital assistant (PDA).

8. A portable terminal system as recited in claim 1, wherein the at least one hardware function includes one or more of vibrating certain portions of the portable terminal, illuminating certain portions of the portable terminal, displaying certain text or graphic messages on a display portion of the portable terminal, playing certain audible sounds on the portable terminal, and either activating or inactivating certain portions of the portable terminal.

9. A portable terminal comprising:
a text browser which accesses and processes text content, wherein the text content which is processed is displayed at a display section of the portable terminal;
a help browser which processes help content, wherein the help content includes specific information regarding how to retrieve or use the text content;
a plurality of switch keys for use in operations for using said text content, and
a switch-key controlling means for individually setting each of said plurality of switch keys to either an effective state or an ineffective state based on said help content,
wherein at least one hardware function of the portable terminal is automatically controlled based on the processed help content in order to assist a user in utilizing the text content.

10. A portable terminal as claimed in claim 9 further comprising:
a judging means for determining whether a message which is received by the portable terminal is text content or help content, wherein the judging means activates the text browser if the message is determined to be help content and activates the help browser if the message is determined to be help content.

11. A portable terminal as claimed in claim 10 wherein; said help browser outputs said help contents as at least one of text, voice, static images and moving images.

12. A portable terminal as claimed in claim 9 wherein if said switch-keys are set to the effective state by the switch-key controlling means, said switch-key controlling means illuminates light emitting sections corresponding to the switch keys which are set to the effective state.

13. A portable terminal as claimed in claim 9 wherein if said switch-keys are set to the effective state by the switch-key controlling means, said switch-key controlling means vibrates operation buttons for those switch keys which are set to the effective state.

14. A method of controlling a portable terminal comprising:
determining whether a message which is received by a portable terminal is text content or help content; and
activating either a text browser, which processes the text content, if the message is determined to be text content, wherein the text content is displayed at a display section of the portable terminal, or a help browser, which processes the help content, if the message is determined to be help content, wherein the help content includes information regarding how to retrieve or use the text content,
wherein at least one hardware function of the portable terminal is automatically controlled based on the processed help content in order to assist a user in utilizing the text content, and
wherein a plurality of switch keys are provided for use in operations for using said text content and each of said plurality of switch keys are individually set to either an effective state or an ineffective state based on said help content.

15. A method of controlling a portable terminal as claimed in claim 14 wherein in said step of activating a text browser or a help browser, said help contents are outputted as at least one of text, voice, static images and moving images.

16. A computer readable storage medium storing a program for controlling a portable terminal, said program comprising:
determining whether a message which is received by the portable terminal is text content or help content; and
activating either a text browser, which processes the text content, if the message is determined to be text content, wherein the text content is displayed at a display section of the portable terminal, or a help browser, which processes the help content, if the message is determined to be help content, wherein the help content includes information regarding how to use or retrieve the help content,
wherein at least one hardware function of the portable terminal is automatically controlled based on the processed help content in order to assist a user in utilizing the text content, and
wherein a plurality of switch keys are provided for use in operations for using said text content and each of said plurality of switch keys are individually set to either an effective state or an ineffective state based on said help content.

17. A computer readable storage medium storing a program for controlling a portable terminal as claimed in claim 16 wherein in said step of activating a text browser or a help browser, said help contents are outputted as at least one of text, voice, static images and moving images.

18. A portable terminal communication system as claimed in claim 17, wherein switch-keys that have been rendered operable by the judgment device are lit-up.

19. A portable terminal communication system as claimed in claim 17, wherein switch-keys that have been rendered operable by the judgment device are controlled to vibrate.

20. A portable terminal communication system comprising:
an information source server connected to a wireline network and operable to separately store target content and help content, wherein the help content is ancillary to the target content and is provided to assist in retrieval of the target content;
a wireless device connected to a wireless network and operable to receive the target content and the help content in respective target and help browsers; and
a radio gateway server connected to both the wireline network and the wireless network and operable to communicate with said information source server through the wireline network and communicate with said wireless device through the wireless network,
wherein at least one hardware function of the wireless device is automatically controlled based on the help content which is received to enable a user of the wireless device to assist a user in utilizing the target content, and
wherein said wireless devices comprises a plurality of switch keys for use in operations for using said target content and a judgment device which determines whether received data is target content or help content and further renders the switch-keys operable or inoperable based on the determination.

21. A portable terminal communication system as claimed in claim 20, wherein the switch-keys of the wireless device are specifically designated for operation in response to the help content.

22. A portable device comprising:

a radio communication port which interfaces with a radio gateway server through a wireless network and receive and segregate target data and help data;

a target display processor which receives the target data, processes the target data and displays the target data on a target data display;

a help display processor which receives the help data, process the help data and display the help data, wherein the help data is exclusively for assisting a user in retrieval of the target data, a plurality of switch keys for use in operations for using said target content; and a judgment device which determines whether received data is target content or help content and further renders the switch-keys operable or inoperable based on the determination, wherein at least one hardware function of the portable terminal is automatically controlled based on the processed help data in order to assist a user in utilizing the target content.

23. A portable device as claimed in claim 22 further comprising:

a vibrator which vibrates only selected switch-keys, wherein said selected switch keys are selected based on said help data.

24. A portable device as claimed in claim 22 further comprising:

a lighting device which illuminates only selected switch-keys, wherein said selected switch keys are selected based on said help data.

* * * * *